US008259166B2

(12) United States Patent
Manico

(10) Patent No.: US 8,259,166 B2
(45) Date of Patent: *Sep. 4, 2012

(54) IMAGE CAPTURE AND DISPLAY DEVICE

(75) Inventor: Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/791,967

(22) Filed: Jun. 2, 2010

(65) Prior Publication Data
US 2010/0238341 A1 Sep. 23, 2010

Related U.S. Application Data

(60) Division of application No. 12/178,854, filed on Jul. 24, 2008, now Pat. No. 7,773,109, which is a continuation of application No. 10/911,281, filed on Aug. 4, 2004, now Pat. No. 7,420,585, which is a continuation-in-part of application No. 10/264,058, filed on Oct. 3, 2002, now Pat. No. 7,042,486, which is a continuation of application No. 09/452,091, filed on Nov. 30, 1999, now abandoned.

(51) Int. Cl.
H04N 7/18 (2006.01)
(52) U.S. Cl. ............... 348/61; 348/14.07; 348/14.11; 348/14.14; 348/14.03; 348/272; 348/294; 348/222.1; 349/7; 349/16; 349/10; 349/86
(58) Field of Classification Search ............. 348/61, 348/14.07, 14.11, 14.14, 14.03, 272, 294; 348/222.1; 349/7, 16, 10, 86
See application file for complete search history.

(56) References Cited

U.S. PATENT DOCUMENTS

| 4,435,047 | A | | 3/1984 | Fergason |
| 4,864,410 | A | | 9/1989 | Andrews et al. |
| 5,027,219 | A | | 6/1991 | Stuttler et al. |
| 5,036,251 | A | | 7/1991 | Lee |
| 5,430,474 | A | | 7/1995 | Hines |
| 5,463,482 | A | | 10/1995 | Jones |
| 5,686,979 | A | | 11/1997 | Weber et al. |
| 5,801,758 | A | * | 9/1998 | Heirich ............. 348/14.16 |
| 5,986,810 | A | | 11/1999 | Webb |
| 6,085,195 | A | * | 7/2000 | Hoyt et al. ............. 1/1 |
| 7,042,486 | B2 | | 5/2006 | Manico et al. |
| 7,420,585 | B2 | * | 9/2008 | Fredlund et al. ........ 348/61 |
| 7,773,109 | B2 | * | 8/2010 | Fredlund et al. ........ 348/61 |

* cited by examiner

Primary Examiner — Shawn An
(74) Attorney, Agent, or Firm — Raymond L Owens

(57) ABSTRACT

A display device for capturing and displaying images along a single optical axis, having an image capture device for capturing the objective image through the display panel when the display device is in a second transmissive state; an image supply source for providing an image to a display panel when the display panel is in a first display state; a mechanism for alternating placing the display panel between the first display state and second transmissive state such that an image can be viewed on the display screen and the object can be captured such that the alternating between the first display state and the second transmissive state is substantially imperceptible to a user of the display panel; and a mechanism for providing digitally image processing for captured images prior to display.

1 Claim, 3 Drawing Sheets

IMAGE CAPTURE AND DISPLAY DEVICE

CROSS REFERENCE TO RELATED APPLICATIONS

This is a divisional of U.S. patent application Ser. No. 12/178,854 filed Jul. 24, 2008, now U.S. Pat. No. 7,773,109 which is a continuation of U.S. patent application Ser. No. 10/911,281 filed Aug. 4, 2004, now U.S. Pat. No. 7,420,585, which is a continuation-in-part of U.S. patent application Ser. No. 10/264,058 filed Oct. 3, 2002, now U.S. Pat. No. 7,042,486, which is a continuation of U.S. patent application Ser. No. 09/452,091 filed Nov. 30, 1999 (abandoned).

Reference is made to commonly-assigned, co-pending U.S. patent application Ser. No. 12/791,961 filed concurrently herewith, entitled "Image Capture and Display Device", by John R. Fredlund, et al, the disclosure of which is incorporated herein.

FIELD OF THE INVENTION

The present invention relates to an electronic image capture and display device, and in particular an image capture and display device of the type employing an electronic camera to capture an image of a subject and an electronic image display device to display images.

BACKGROUND OF THE INVENTION

U.S. Pat. No. 4,864,410, issued Sep. 5, 1989 to Andrews et al., illustrates a technique using a beam splitter, electronic camera, and a video display (CRT) to simultaneously capture and view a subject on the same optical axis similar to the function of a conventional optical mirror. The images captured by the camera can be processed prior to display to provide special effects such as the distortions employed in a fun-house mirror. The problem with this technique is that the displayed image appears to be located at a distance behind the beam splitter, compromising the "mirror-like" function of the unit. In addition, the video display device must be masked off or it may be viewable by the user also detracting from the "mirror experience". It is well known and desirable to use a touch screen as a means for providing an interface between a user and a display device such as a CRT, however with the arrangement described by Andrews et al., the interface with a touch screen located between the user and the beam splitter does not provide a satisfactory feel, since when the subject places her finger on the touch screen, the image of the subject's finger does not appear to be located at the screen, rather it appears to be displaced to the rear of the screen.

Using a conventional rear projection screen and a digital projector would provide a display image that would appear in a viewing plane like a conventional mirror, and would function in a satisfactory manner with a touch screen interface, but a conventional rear projection screen would prevent the camera from "seeing" the subject, unless a hole was provided in the center of the screen. This is not a very satisfactory solution.

U.S. Pat. No. 5,801,758 issued Sep. 1, 1998 to Heirich discloses a system for image capture and display. The system includes an image capture apparatus, an image projection apparatus, and an optical switching device that switches an optical path between the image capture and the image projection apparatus. A highly transparent surface, such as a sheet of clear glass is used as a display screen through which the image capture apparatus can view a user, and onto which the image of the user is projected. The problem with this arrangement is that the highly transparent surface allows the user to directly view the projection lens of the image projection apparatus. Any image formed on the highly transparent surface is overwhelmed by the bright appearance of the projection lens.

Another problem in the prior art is the ability to capture an image of person on the same optical axis on which the person is viewing a display device. For example, with regard to video conferencing, a capture camera is positioned at an optical axis different from which the person is viewing the other individual on the video conference call. The problem with the described situation is that the person viewing the display while being recorded by an off-axis camera appears to fail to make eye contact with the recording camera and whoever may be viewing that image. There is a similar problem with an individual using a teleprompter. A person reading from a teleprompter is looking in a direction off axis from the optical axis of a camera capturing the image of the reader.

There is a need therefore for an improved image capture and display device that avoids the shortcomings of the prior art.

SUMMARY OF THE INVENTION

In accordance with one aspect of the present invention there is provided a display device for capturing and displaying images along a single optical axis, comprising:

a display panel having a front side and a back side, the display panel capable of being placed in a first display state which allows displaying of an image on the front side for viewing of an image and a second transmissive state wherein the display panel becomes substantially transmissive so as to allow capture of an image of an object positioned in front of the front side of the display panel;

an image capture device for capturing the objective image through the display panel when the display device is in the second transmissive state;

an image supply source for providing an image to the display panel when the display panel is in the first display state; a mechanism for alternating placing the display panel between the first display state and second transmissive state such that an image can be viewed on the display screen and the object can be captured in a manner such that the alternating between the first display state and the second transmissive state is substantially imperceptible to a user of the display panel; and a mechanism for providing digitally image processing for captured images prior to display.

In accordance with another aspect of the present invention, there is provided a display device for capturing and displaying images along a single optical axis, comprising:

a display panel, includes means for causing becomes substantially transmissive so as to allow capture of an image of an object positioned in front of the front side of the display panel;

an image capture device for capturing the objective image through the substantially transmissive display panel; and an electronic, optical, or computational means for compensating for any non-transmissive elements of the display panel so that the presented image appears without artifacts caused by non-transmissive elements.

In accordance with yet another aspect of the present invention, there is provided a display device for capturing and displaying images along a single optical axis, comprising:

a display panel having a front side and a back side, the display panel capable of being placed in a first display state which allows displaying of an image on the front side for viewing of an image and a second transmissive state wherein the display panel becomes substantially transmissive so as to allow capture of an image of an object positioned in front of the front side of the display panel;

an image capture device for capturing the objective image through the display panel when the display device is in the second transmissive state;

an image supply source for providing an image to the display panel when the display panel is in the first display state;

a mechanism for alternating placing the display panel between the first display state and second transmissive state such that an image can be viewed on the display screen and the object can be captured in a manner such that the alternating between the first display state and the second transmissive state is substantially imperceptible to a user of the display panel; and a touch screen positioned over the display panel.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figures 1, 2:
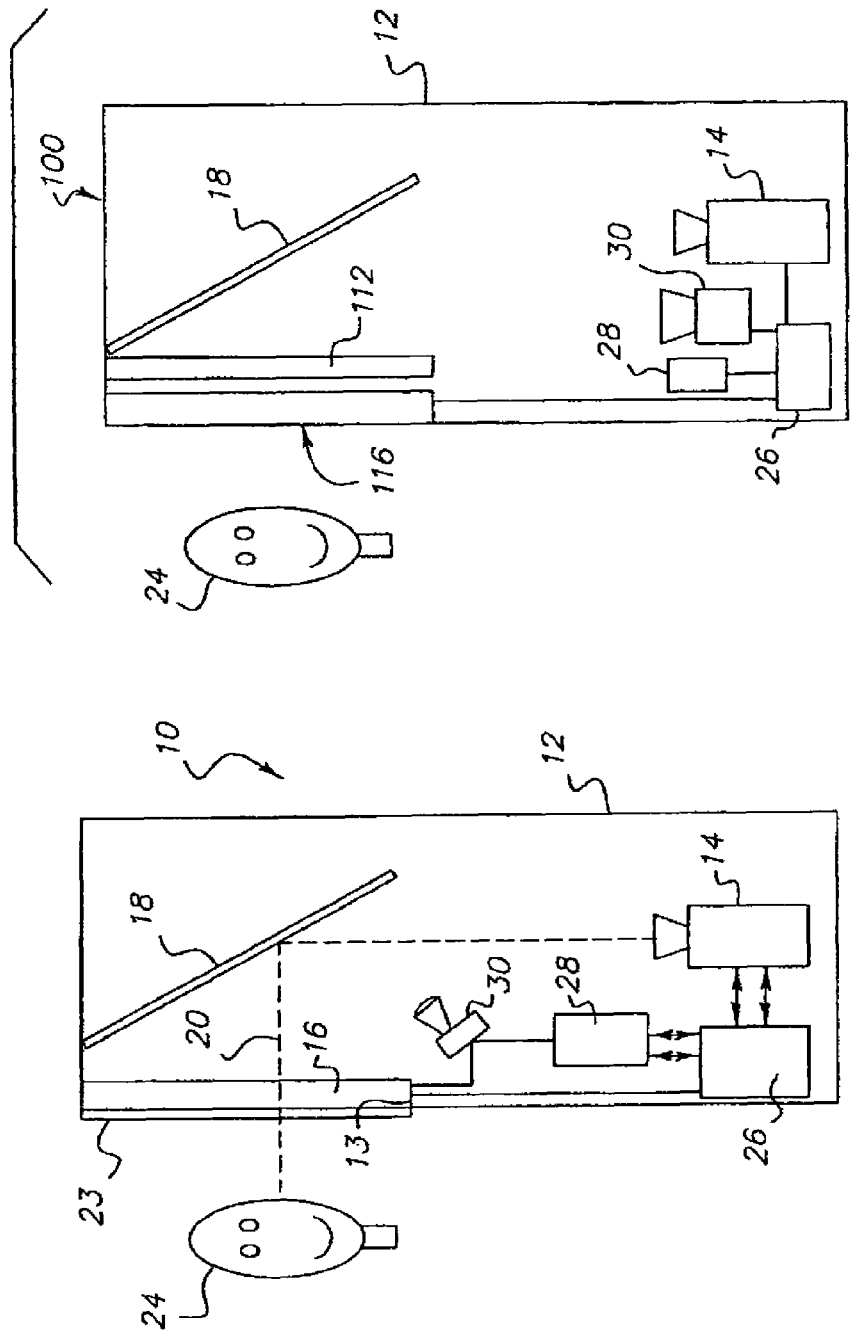
FIG. 1 is a schematic diagram of an image capture and display device according to the present invention.
FIG. 2 is a schematic diagram of a modified image capture and display device made in accordance with the present invention.

Referring to FIG. 1, the image capture and display device, generally designated 10, according to the present invention is housed for example in a cabinet 12. It will be understood that the capture and display device may be a component of a larger device such as a photobooth (not shown). An electronic camera 14 such as a KODAK DIGITAL SCIENCE DVC323 Digital Video Camera available from the Eastman Kodak Company, Rochester, N.Y., and a display panel 16 such as an OLED panel available from the Eastman Kodak Company, Rochester, N.Y., are located in the cabinet 12 with respect to an optical element such as a fully silvered mirror 18 in a known manner such that they share a common optical axis 20. The display panel 16 is positioned in a front opening 13 of the cabinet 12. Display panel 16 is electronically switchable between a first state and a second state. Display panel 16 may comprise for example a matrix of Organic Light Emitting Diodes that change state when an electrical current is applied. In the "power off" state (transmissive state), the material is substantially transparent and suitable for viewing there through. In the "power on" state, the display panel 16 will display an image for viewing by an individual (viewer) 24 positioned in front of display panel 16. The interior and contents of the cabinet 12 is unlighted and preferably painted a matte black so that when the display panel 16 is in the "power off" state, an individual 24 does not see the interior of the cabinet. In a preferred embodiment, the brightness of display panel 16 is such that any small amount of light within cabinet 12 will go unnoticed. It is preferred to use a camera of high sensitivity so that the ambient illumination of the user is adequate for high quality image capture. An optional lamp may be provided for illuminating the user 24 during image capture by camera 14. Lamp 30 is turned on only during image capture by camera 14 so as to minimize interference with the image on display panel 16, and to minimize the light impinging upon the eyes of user 24.

In the preferred embodiment, display panel 16 is fully transparent so that it does not interfere with the capture of the image of user 24 by camera 14. If this is not the case, and only a portion of display panel 16 is transparent, the portions of display panel 16 that are not transparent must be taken into account. For example, if the transistors used to turn individual transparent OLED devices on and off are themselves not transparent, the result is that only the portions of display panel 16 that comprise the OLED devices will allow capture of user 24 by camera 14. The effect will be that of looking through a fine pitch screen. Thus, the screen must be interpolated out of the captured image, or the image must be somewhat blurred by electronic, optical, or computational means so that the presented image of the user appears without the screen artifact.

An optional touch screen 23 may be provided over display panel 16. The touch screen 23 can be of the type having an array of infrared transmitters and detectors arranged around the periphery of the display panel 16, or a transparent pressure sensitive panel disposed over the display panel 16. The display panel 16 is located with respect to common optical axis 20, for allowing the electronic camera 14 to capture the image of a subject 24 through the display panel 16 when in the transparent state and for displaying an image by the digital display panel 16 for viewing by individual (user) 24 along a viewing axis. In the embodiment illustrated, digital display panel 16 comprises OLED device. An example of a suitable organic light emitting diode (OLED) display device/panel for practicing the present invention is illustrated in the Kodak EasyShare LS633 zoom digital camera.

Returning to FIG. 1, control of the image capture device 14 and display device 16, and digital image processing is provided by a computer 26, such as a standard microprocessor or personal computer. The output of the camera 14 and the input to the digital display panel 16 are connected and controlled by computer 26. The computer 26 can function as both a controller and/or as an image processing computer. It will be understood that a separate controller and digital image processing electronics can be provided. A digitally controlled driver 28 is provided for driving the display panel 16 to switch it back and forth between its first transparent state and second viewing state.

In operation, the computer/controller 26 and driver 28 first switches the display panel 16 to its transparent state by signaling driver 28 to de-energize the screen, then captures an image from camera 14, and then switches the display panel 16 to its viewing state, and back again via a signal to driver 28 to the display device 16, making it transparent. This cycle is then repeated preferably at a rate of at least 24 complete cycles per second to provide the appearance of a smooth and "flicker free" display. That is, in a manner such that said alternating between said first display state and said second transmissive state is substantially imperceptible to a user of said display panel. The captured images may be processed by the computer 26 prior to display using known image processing techniques. The capture image may be forwarded to second image capture and display device 10' (not shown) for viewing by another party and capture of the other party for view by the individual at the first device 10. The second device 10' being substantially identical in performance as the first device 10. In this way there may be two way video conferencing wherein both parties are looking at the display device thereby providing a more pleasing on-screen appearance for both parties. The display is more pleasing because both users 24 and 24' (not shown) are looking directly at the display of the other user and effectively making eye contact since the display and capture device are on the same optical access.

Alternatively, the device 10 may be operated in a manner to provide a mirrored image of the individual in front of display panel 16. The mirrored image may be modified to incorporate desired effects, for example, the image may be geometrically distorted as in a fun house mirror. Alternatively, background scenes may be added using known blue screen techniques, colors may be modified or pre-stored image elements, such as mustaches, hats, glasses etc. may be digitally added. Also articles of clothing may be added to the image of the subject, for example to show how the subject would appear in the article of clothing. Note that the processed image does not need to immediately follow the capture, but may be delayed by several frames to allow time for the digital processing to be preformed.

Referring to FIG. 2 there is illustrated a schematic view of a modified device 100 wherein like numerals indicate like parts and operation as previously described with respect to device 10. In this embodiment, display panel 16 comprises a liquid crystal display (LCD) 116 is provided in place of an OLED. In this embodiment, a diffuser 112 is used for providing a substantially uniform light source for illuminating LCD 116. When LCD 116 and diffuser 112 are in the off non-energized state, they are at least partially transparent so the camera 14 can capture an image of the individual 24. This image will have the pattern associated with the color filter array of the LCD. This must be taken into account when processing the captured image. When camera 14 is off and it desired to display an image on LCD 116, the LCD 116 and diffuser 112 are in the energized state. The LCD 116 has pixels that can be turned on so that varying levels of light will pass through the pixels to form an image. Preferably red, green, and blue pixels are provided so that color image may be generated on LCD 116. Light from lamp 30 is used to back-light the image formed by LCD 116 and is diffused by diffuser 112. In operation the LCD 116 diffuser 112 and lamp 30 are cycled between the energized and de-energized states with the camera capturing an image during the de-energized state and an image being displayed during the energized state. The lamp 30 may also be used to illuminate the user for at least a portion of the time the camera captures an image. Here as with the OLED, the rate of cycling between the energized and non-energized state is at a rate so that "flicker" of the image is not perceived by the viewer. A rate of at least 24 or more cycles per second is preferred.

Preferably during capture, the pixels of each color area are placed in the condition where they pass the maximum amount of light, but this maximum will be a wavelength specific according to the color of the pixel. Thus, the image captured will have the effect of this array imposed upon the viewer 23. One solution to this problem is to provide the LCD array with high resolution and camera 14 with low resolution. In this fashion, the individual pixels of the LCD array 116 blur together to create an image that does not appear to be captured through the LCD array. Alternatively a blurring filter in camera 14 may achieve the same result. Another solution is to take advantage of the known pattern of the LCD array 116. In this case, camera 14 can be color or monochrome, and of a resolution high enough to resolve the pixels of the LCD array 116. The image of user 23 is overlaid with the color pattern of LCD array 116. When the image of user 23 is captured with a color camera, the missing values of red, blue, and green must be interpolated. In the case of monochrome capture, red, green and blue pixel values are determined from known positions of the colored pixels, and then the missing values can be calculated from the monochrome capture. Registration or calibration markings may be provided to ease computational complexity. Other color combinations such as cyan, magenta, and yellow can be used.

Figure 3:
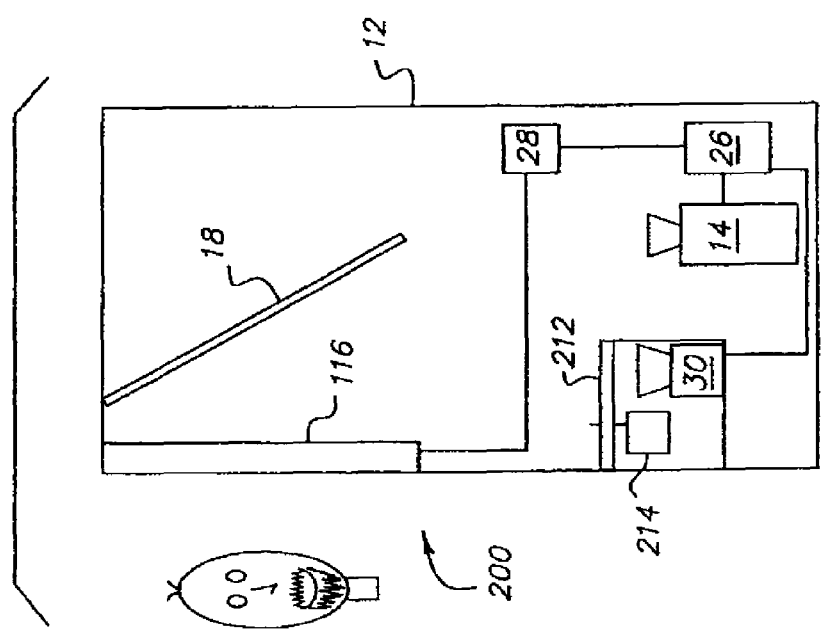
FIG. 3 is a schematic diagram of another modified image capture and display device made in accordance with the present invention.

Referring to FIG. 3, there is illustrated a schematic of yet another modified capture and display device 200 similar to devices 10 and 100, like numerals indicating like parts and operation as previously described. In this embodiment of device 200, there is provided a rotating diffuser 212 that is provided in front of lamp 30 for not only diffusing the light but also acting as shutter for allowing light from the lamp 30 to be directed to the LCD 116. A motor 214 controls the rate of rotation of diffuser 212 and is synchronized with the turning on and off of the LCD 116.

Figure 4:
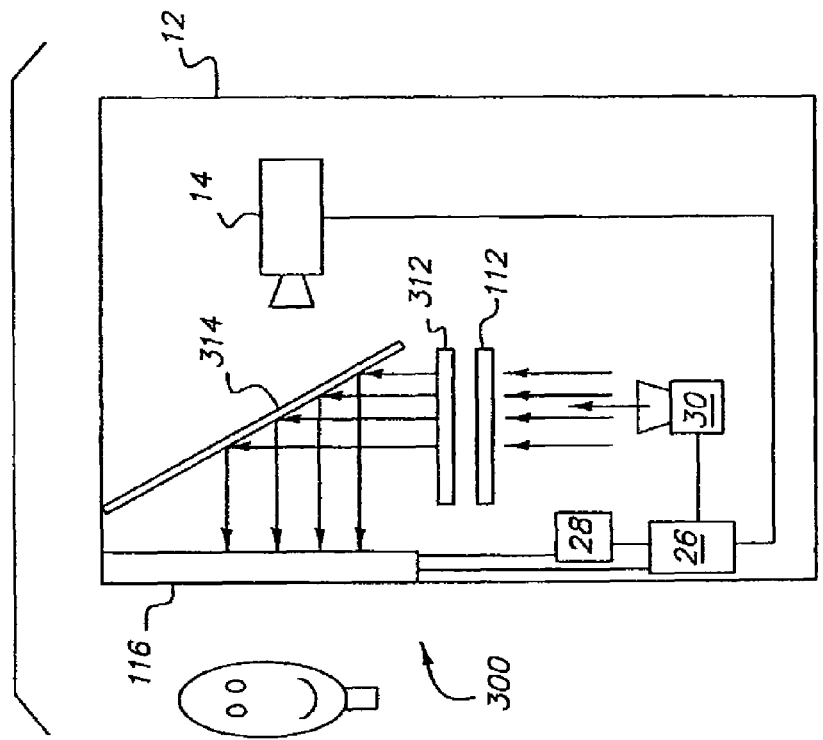
FIG. 4 is a schematic diagram of yet another modified image capture and display device made in accordance with the present invention

Referring to FIG. 4 there is illustrated a schematic of still another modified capture and display device 300 similar to devices 10, 100, and 200 like numerals indicating like parts and operation as previously described. In this embodiment lamp 30 provides the light for back lighting LCD array 116. A collimator 312 is provided for collimating the light before reaching a half silver mirror 314. The light reflected off mirror 314 is displayed on LCD diffuser 112 during the image display cycle. During the image capture portion of the cycle, the diffuser 112 is changed to its transparent state so as to allow capture of an image by cameras 320 behind mirror 314. Collimator 312 is essential to this embodiment so that the light passing through every pixel in LCD 116 is traveling in a parallel manner to light one small portion of the diffuser 112.

Figure 5:
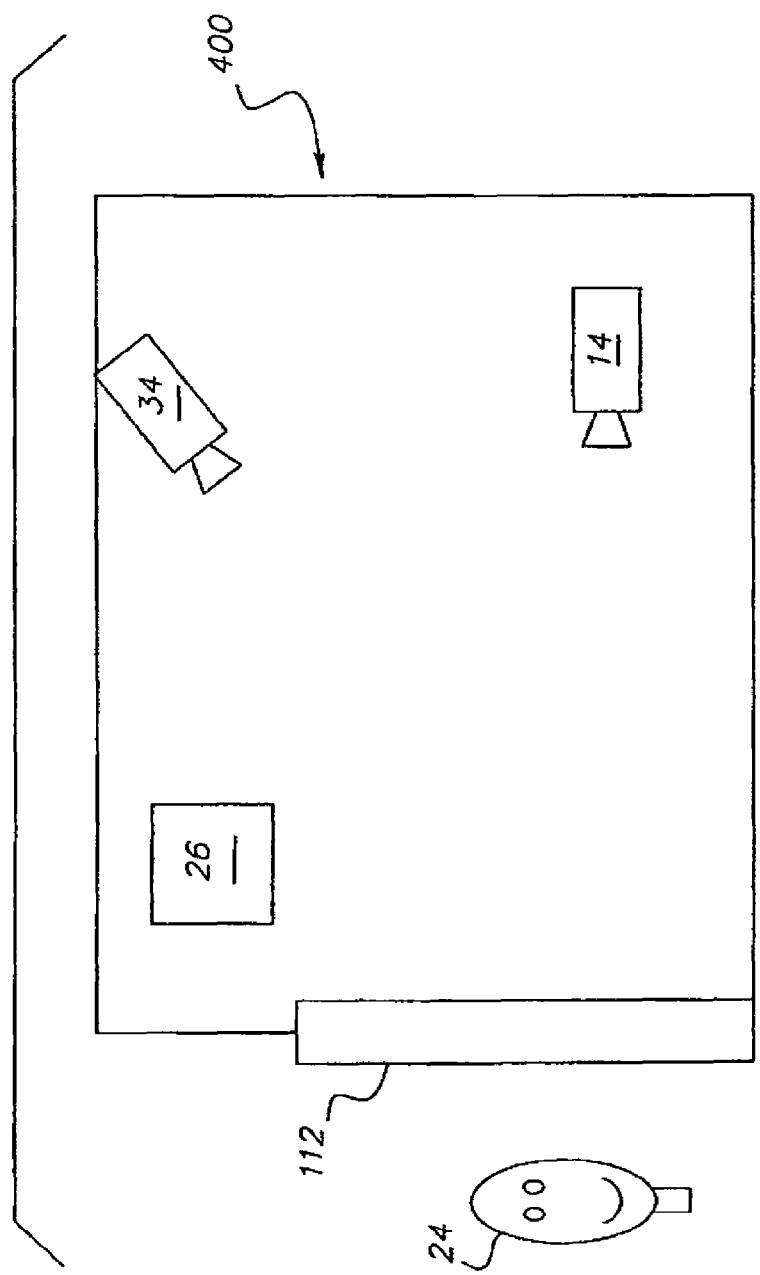
FIG. 5 is a schematic diagram of still another modified image capture and display device made in accordance with the present invention.

Referring to FIG. 5 there is illustrated a schematic of still another modified capture and display device 400 similar to devices 10, 100, 200 and 300 like numerals indicating like parts and operation as previously described. In this embodiment, camera 14 is placed directly on the optical axis of device 400 so that user 24 is looking straight into the camera as he observes the display on diffuser 112. The sequence of display and capture is as described above. Projector 34 illuminates diffuser 112 during the display portion of the cycle. Projector 34 is placed off the optical axis of device 400 so that user will not perceive a hot spot in the illumination of diffuser 112. Projector 34 is placed such that there is not a direct line from projector 34 through diffuser 112 to user 24. In a preferred embodiment, the light from projector 34 strikes diffuser 112 from above. It is unlikely that user 24 will view display device 400 from below the optical axis, and there will be no perception of a hot spot. Mirrors (not shown) may be used to reduce the depth of device 400.

The invention has been described in detail with particular reference to certain preferred embodiments thereof, but it will be understood that variations and modifications can be effected within the scope of the invention.

PARTS LIST 10 image capture and display device
10' second image device
12 cabinet
13 front opening 14 electronic camera
16 display panel
18 fully silvered mirror
19 partially silvered mirror
20 common optical axis
21 light
22 light valve projection screen
23 touch screen
23 viewer
24 subject
24' user
26 computer
28 digitally controlled driver
30 optional lamp
30 mechanical shutter
32 motor
34 projector
34 optical panel
36 liquid crystal device
38 transparent substrate
40 transparent substrate
42 liquid crystal material
44 transparent conductive layer
46 transparent conductive layer
48 alignment layer
50 alignment layer
52 alignment arrow
54 alignment arrow
56 polarizer
58 polarizer
60 electrical lead
62 electrical lead
100 modified device
110 LCD
112 diffuser
116 LCD
200 display device
212 rotating diffuser
214 motor
300 display device
312 collimator
314 silver mirror
320 cameras
400 display device

The invention claimed is:

1. A display device for capturing and displaying images along a single optical axis, comprising:
a display panel having a front side and a back side, the display panel capable of being placed in a first display state which allows displaying of an image on the front side for viewing of an image and a second transmissive state wherein the display panel becomes substantially transmissive so as to allow capture of an image of an object positioned in front of the front side of the display panel;
an image capture device for capturing the objective image through the display panel when the display device is in the second transmissive state;
an image supply source for providing an image to the display panel when the display panel is in the first display state;
a mechanism for alternating placing the display panel between the first display state and second transmissive state such that an image can be viewed on the display screen and the object can be captured in a manner such that the alternating between the first display state and the second transmissive state is substantially imperceptible to a user of the display panel; and
a touch screen positioned over the display panel.

* * * * *